US00RE36134E

United States Patent [19]

Stein

[11] E Patent Number: Re. 36,134

[45] Reissued Date of Patent: Mar. 9, 1999

[54] RACK SYSTEM FOR DISPLAYING AND DISPENSING CANDY

[75] Inventor: Andrew M. Stein, Massapequa Park, N.Y.

[73] Assignee: Six Corners Development Company, Amityville, N.Y.

[21] Appl. No.: 873,911

[22] Filed: Jun. 12, 1997

Related U.S. Patent Documents

Reissue of:

[64] Patent No.: 5,553,723
Issued: Sep. 10, 1996
Appl. No.: 328,326
Filed: Oct. 24, 1994

[51] Int. Cl.[6] ..... A47F 3/14; A47J 47/00

[52] U.S. Cl. ..... 211/133.1; 211/194; 211/71.01; 211/128.1; 248/551

[58] Field of Search ..... 211/128.1, 133.1, 211/71.01, 194; 248/551, 553; 280/79.3

[56] References Cited

U.S. PATENT DOCUMENTS

| | | | |
|---|---|---|---|
| 450,419 | 4/1891 | McIlhenny | 211/17 |
| 2,147,759 | 2/1939 | Sulentic | 211/128 |
| 2,754,998 | 7/1956 | Doepke et al. | 211/128 X |
| 2,791,325 | 5/1957 | Schecter et al. | 211/128 X |
| 2,937,763 | 5/1960 | Ingold | 211/128 |
| 4,535,863 | 8/1985 | Becker | 248/551 X |
| 4,579,358 | 4/1986 | Byfield, Jr. | 280/79.3 X |
| 4,646,921 | 3/1987 | Canter | 211/133 X |
| 4,673,092 | 6/1987 | Lamson et al. | 211/194 X |
| 5,111,944 | 5/1992 | Ostermeyer | 211/133 |
| 5,139,173 | 8/1992 | Evinger | 222/185 |

FOREIGN PATENT DOCUMENTS

| | | | |
|---|---|---|---|
| 317725 | 1/1957 | Switzerland | 211/128 |

*Primary Examiner*—Robert W. Gibson, Jr.
*Attorney, Agent, or Firm*—Pennie & Edmonds

[57] ABSTRACT

The present invention relates to a rack structure for displaying and dispensing candy which comprises a plurality of enclosed containers arranged in first second and third rows, each container being totally enclosed on all sides and having a base, a supply of candy and a downwardly extending outlet for dispensing candy from the supply; and a support structure for retaining the containers in spaced relation in the rows. The support structure of each row of containers includes first and second horizontally disposed rods each having first and second ends, the enclosed containers supported on the first and second horizontally disposed rods; connecting bars for engaging the rod ends to maintain the rods in substantially parallel spaced relation for supporting the base of each container; vertical support rods for positioning the support structure to enhance the visibility of the containers; and at least one catch basin supported on the first horizontal rod in position under one or more of the container outlets for receiving candy that has been improperly dispensed, thus preventing spills of the same.

34 Claims, 5 Drawing Sheets

RACK SYSTEM FOR DISPLAYING AND DISPENSING CANDY

Matter enclosed in heavy brackets [ ] appears in the original patent but forms no part of this reissue specification; matter printed in italics indicates the additions made by reissue.

FIELD OF THE INVENTION

The present invention relates to a new rack system more particularly to a rack structure for holding candy containers as well as for displaying and dispensing candy therefrom. This system includes a novel locking mechanism for securing tubular display elements in position on the rack structure, as well as to novel catch basin arrangements for preventing spills of candy during dispensing.

BACKGROUND OF THE INVENTION

Conventional rack systems for displaying and dispensing candy and the like are usually made in the form of a solid, wooden shelved structures. Often, such structures are placed on a tabletop or countertop. These structures occupy a relatively large amount of space which leaves a relatively limited area for placement of the candy containers. Due to the limited open area that a conventional solid rack system provides, the candy within the containers cannot be seen very well by consumers and thus, the display function of the rack system is reduced. Moreover, the solid structure of the rack results in a bulky system which can be difficult or impossible to move.

In a conventional rack system, various kinds of candy display containers are simply placed on some type of support without being secured thereto. Unauthorized access to the candy inside the display containers or even pilferage of entire candy display containers can occur when left unattended. This can cause economic loss to the merchant. Since it is not practicable to move the display to a locked or restricted access location, a solution is needed to prevent pilferage of the candy from the display containers without moving the display.

When conventional candy dispensers are in use, accidental spills of candy onto the floor are essentially unavoidable. Such spills not only cause waste of the candy but also create a messy and possibly dangerous, e.g., slippery, condition. Therefore, it is desirable to resolve this problem so that the merchant can avoid loss of otherwise salable product and maintain the cleanliness of the dispensing area.

SUMMARY OF THE INVENTION

It is an object of the present invention to provide a rack system for holding a plurality of candy containers for displaying and dispensing candy therefrom.

It is another object of the present invention to provide a locking mechanism for securing tubular candy display elements in position and preventing unauthorized withdrawal of candy therefrom.

It is a further object of the present invention to provide a device which prevents or reduces spills of the candy from the dispenser onto the floor.

It is a still further object of the present invention to provide a new rack system which can be easily moved from one place to another.

Thus, the present invention relates to a rack structure for displaying and dispensing candy which comprises a plurality of containers arranged in a first row, each container having a base, a supply of candy, and an outlet for dispensing candy from the supply. The containers are placed upon a support structure for retaining them in spaced relation in the row. The support structure includes first and second horizontally disposed rods each having first and second ends; means for engaging the rod ends to maintain the rods in substantially parallel spaced relation for supporting the base of each container; means for positioning the support structure to enhance the visibility of the containers; and at least one catch basin supported on the first horizontal rod in position under one or more of the container outlets for receiving candy that has been improperly dispensed, thus preventing spills of the same.

In this rack structure, a separate catch basin made of plexiglass and having a base portion, at least one sidewall extending from the base portion and a hook member for engaging the first horizontal supporting rod, may be positioned beneath each container outlet. The catch basin may instead have an elongated portion which spans the entire width of the row positioned beneath the container outlets. In the latter embodiment, the catch basin includes a wire support structure which extends along the width of the row of containers. The wire structure includes an open area beneath each outlet which is configured and dimensioned to support a bowl member such that each bowl member is positioned below a container outlet.

The rack structure of the present invention also contemplates a plurality of containers arranged in a second row, wherein each container is essentially the same as those of the first row except that the support structure for the second row is positioned subjacent to the support structure of the first row and in offset vertical relation therewith. In this embodiment, the first and second row rod ends engaging means each comprises first and second bar members, the first bar member engaging the first rod ends of the first and second horizontal rods and the second bar member engaging the second rod ends of the first and second horizontal rods. The positioning means for first row support structure may include means for connecting the first and second bar members of the first row support structure to the first and second bar members of the second row support structure, such as vertically extending rod members having upper and lower ends. Preferably, each connecting means comprises two pair of vertically extending rod members, one pair positioned adjacent the first containers of the first and second rows with the other pair positioned adjacent the last containers of the first and second rows.

It is useful to include a bar member for connecting the lower ends of each pair of vertically extending rod members, and wheel means associated with each lower end connecting bar member to facilitate movement of the rack structure. The lower end connecting bar members may be maintained in spaced relation by at least two horizontally extending support bars for strengthening the structure and for providing a support structure for storage of materials thereon.

Further, the rack system of the invention may include a plurality of containers arranged in a third row, wherein each container is essentially the same as those of the first and second rows except that the support structure for the third row is positioned subjacent to the support structure of the second row and in offset vertical relation therewith. The positioning means for second row support structure preferably comprises means for connecting the first and second bar members of the second row support structure to the first and second bar members of the third row support structure, such as vertically extending rod members having upper and lower ends. For this embodiment, one of each pair of vertically extending rod members is a single rod member which extends directly from the first support structure through the second support structure to the third support structure.

In addition, it is advantageous to include a series of tubular elements for displaying the candy of some of the containers. At least two vertically extending rod members are connected by a base plate member for supporting the tubular elements, and by a top plate member for retaining the tubular elements in the desired position on the base plate member. Each tubular element has a top end, a bottom end and positioning means associated with the bottom end while the base plate member includes alignment means for engaging the positioning means of each tubular element. The top plate member has first and second ends, a central elongated portion and first and second wall members which extend past the top ends of the tubular elements for retaining them in position on the base plate member.

To prevent pilferage of the candy in the tubular elements, each of the first and second ends of the top plate member includes locking means for engaging the vertical rod member to prevent unauthorized removal of the tubular elements or contents therein. Each locking means preferably comprises a slot in the respective vertical rod member and a cam member positioned in the top plate member which cam is movable from a first position wherein the cam engages the slot of the vertical rod member for securely retaining the top plate member to the vertical rod member and a second position where the cam is positioned away from the slot so that the top plate member can be removed from the vertical rod members to allow access to the tubular display elements.

The single vertically extending rod elements extend from the top of the structure to the bottom as a common member. Reinforcement members may be used for strengthening the rack structure. If so, the reinforcement members preferably comprise diagonally extending bars which connect the single vertically extending rod members.

BRIEF DESCRIPTION OF THE DRAWINGS

These and other features, aspects and advantages of the present invention will become much more apparent from the following drawings, in which.

DESCRIPTION OF THE PREFERRED EMBODIMENTS

Figure 1:
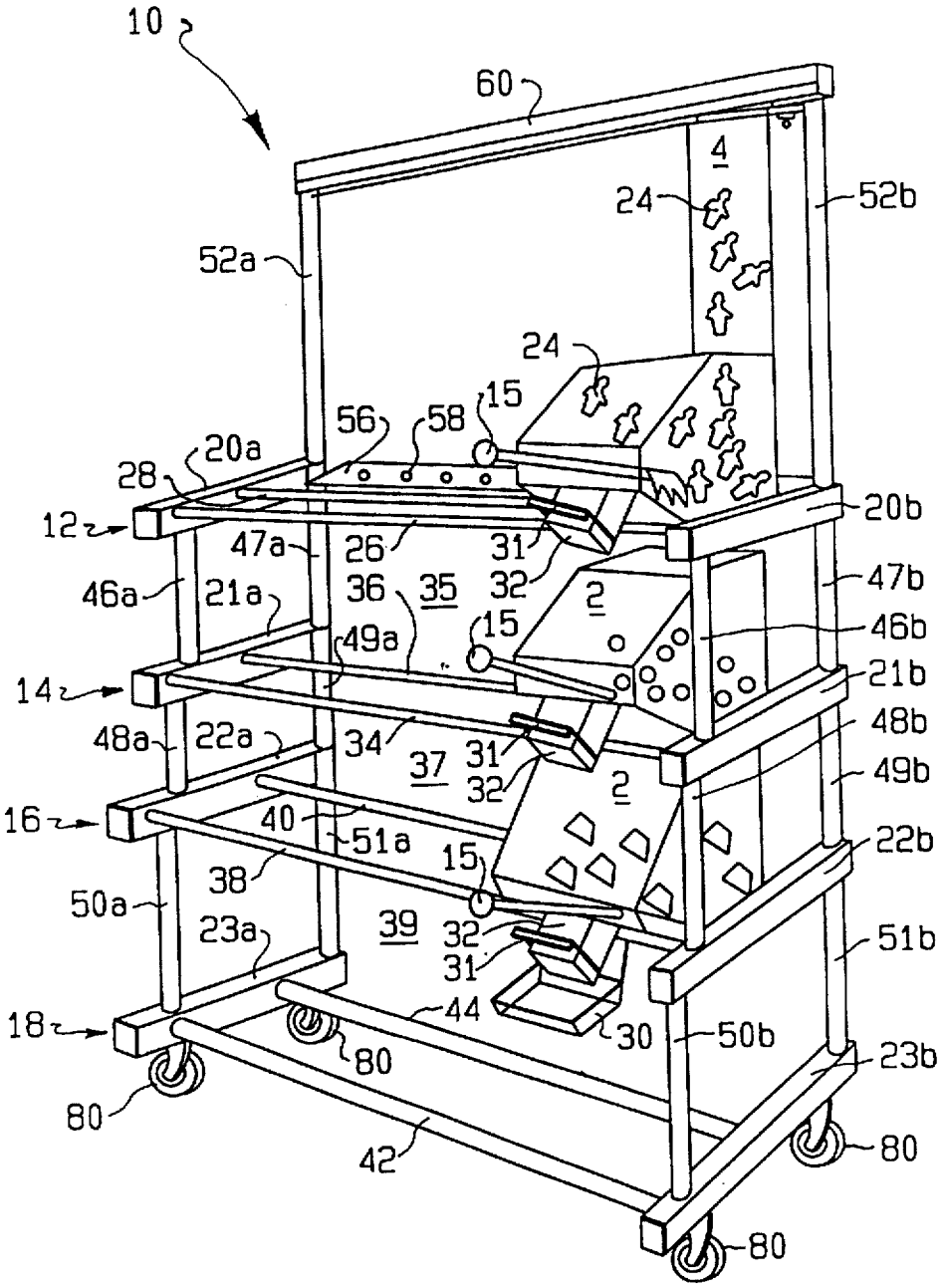
FIG. 1 is a front perspective of a rack system according to the present invention, on which a plurality of candy containers are mounted.
Figure 2:
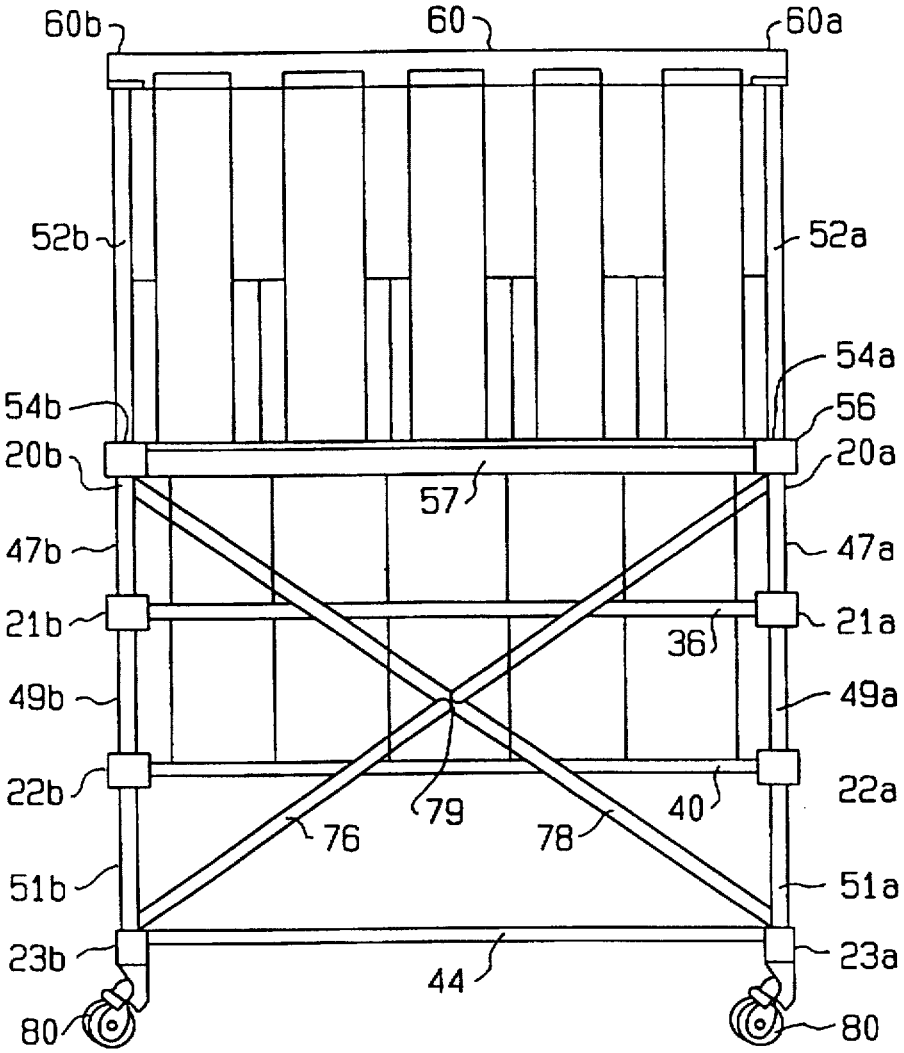
FIG. 2 is a rear view of the rack system of FIG. 1.

Referring to FIGS. 1 and 2, a rack system 10 according to the present invention is shown which has four support structures 12, 14, 16 and 18. The number of support structures in the rack system 10 can be one, two, three or more according to different needs of the merchants. Preferably, the number of support structures ranges from two to six. Since all the support structures have a similar configuration only the top support structure 12 will be described in detail below.

In the top support structure 12, a pair of side bars 20a and 20b are parallelly arranged and spaced from each other at a distance to define the width of the structure 12. This width is preferably sufficient to locate a row of adjacent candy containers 2 thereon. Preferably, each row may include up to five containers, but the precise number depends upon the needs of the merchant and are not critical to the operation of the invention.

Different pairs of side bars 20a and 20b, 21a and 21b, 22a and 22b and 23a and 23b in the different support structures 12, 14, 16 and 18 will generally have different lengths. Preferably, the length of the pairs of side bars increases from the top support structure 12 to the bottom 18 to facilitate placement of the rows in the vertical subjacent staggered configuration to facilitate access to the enclosed containers for dispensing of candy therefrom. Also, this arrangement provides stability to the rack structure. Side bars 20a, 20b, 21a, 21b, 22a, 22b, 23a and 23b are preferably steel tubing with a rectangular cross-section.

The two side bars 20a and 20b in the top support structure 12 are rigidly connected with two laterally extended supporting rods 26 and 28 by conventional connection means (not shown) to form a plane frame. The two lateral supporting rods 26 and 28 are spaced from each other at a distance determined according to the corresponding size of containers 2 in order to hold each container 2 in an appropriate dispensing position. The number of supporting rods can also vary, preferably from two to five. The length of the lateral supporting rods 26 and 28 is approximately equal to the width of the candy rack 10, which is of sufficient dimensions to hold a row of the desired amount (e.g., five) containers 2 arranged adjacent to one another.

The front laterally extended support rods 26 can be connected between the front ends of the side bars 20a and 20b in the top support structure 12 for suspending candy catch basins 30 beneath each of the outlets 32 of the containers 2. Only one such catch basin 30 is shown in FIG. 1, but it is understood that a single catch basin is preferably provided beneath each outlet of the containers (see FIG. 5), an elongated single bowl catch basin can be provided beneath the outlets of each row of containers (FIG. 6) or a single wire structure for supporting separate bowls beneath each outlet of the containers (see FIG. 7) can be provided. Lateral supporting rods 26 and 28 are preferably steel tubing which have a round cross-section to facilitate placement of the candy containers and attachment of the catch basins. Specifically, the containers 2 have a lower base portion which extends between the rods and an upper portion which sits on the top of the rods, while the catch basin includes a hook member for engaging the rod.

The side bars 20a and 20b can be connected to the lateral supporting rods 26 and 28 by any conventional means for connecting steel tubing. Preferably, side bars 20a and 20b have a number of holes corresponding to the number of supporting rods provided on their inner sides for the insertion of lateral supporting rods 26 and 28. Welding or brazing can be then applied at the junctions of side bars 20a and 20b and supporting rods 26 and 28. Side bars 20a and 20b and supporting rods 26 and 28 can also be removably connected through various conventional means so that the top support structure 12 can be disassembled for convenience during shipment of the rack structure.

Different support structures 12, 14, 16 and 18 are positioned and spaced from each other by vertical supporting rods 46a, 46b through 51a, 51b which are connected to the respective side bars by conventional connection means. Typically, a group of four vertical supporting rods, e.g., 46a, 46b, 47a and 47b, of the same length are rigidly connected between the opposed side bars, e.g., 20a, 20b and 21a, 21b, to form an open area 35 therebetween for placement of the candy containers 2. In addition, candy containers can be placed upon rods 26, 28 to form the top row of containers.

Preferably, two vertical supporting rods 46b and 47b are connected at the same side of the rack system 10 between two corresponding side bars 20b and 21b of adjacent support structures 12 and 14. One of the two vertical supporting rods 46b is connected near the front end of the side bar 20b while the other rod 47b is connected near the rear end of the side bar 20b. The connection between vertical supporting rods 46a to 47a and side bar 20a and 21a are similar to that described above for supporting rods 46b, 47b and side bars 20b and 21b.

The second 14 and third 16 support structures are connected via lateral supporting rods 34, 36 and 38, 40, respectively, and through vertical supporting rods 48a, 49a and 48b, 49b, respectively. Similarly the third 16 and fourth 18 support structures are connected via lateral supporting rods 38, 40, 42, and 44, respectively, and through vertical supporting rods 50a, 51a and 50b, 51b, respectively. These provide open areas 37 and 39, respectively. The open area 37 can receive an additional row of candy containers 2, while the open area 39 can be used for storage of additional containers or other accessories. It is unlikely that open area 39 would be used for dispensing candy from containers 2 because it is in an inconvenient location for the operator of the system compared to the other locations for the containers. Also, the rows of containers are preferably vertically offset to further facilitate the dispensing of candy from the rows of containers. If desired, all supporting rods and side bars can be removably connected, so that the entire rack system 10 can be disassembled for the convenience of shipment.

The specific size of the open area can be varied between any adjacent support structures by using vertical supporting rods of different lengths. Typically, the top support structure 12 and all the intermediate support structures 14 and 16 are spaced equally for holding candy dispensers 2 of the same size. However, vertical supporting rods 50a, 50b, 51a and 51b connected between the support structures 16 and 18 have a longer length in order to provide a larger space 39 therebetween. Thus, the bottom support structure 18 can thus be used to store additional candy supplies so that replacement of any empty candy containers can be made expeditiously.

Figure 3:
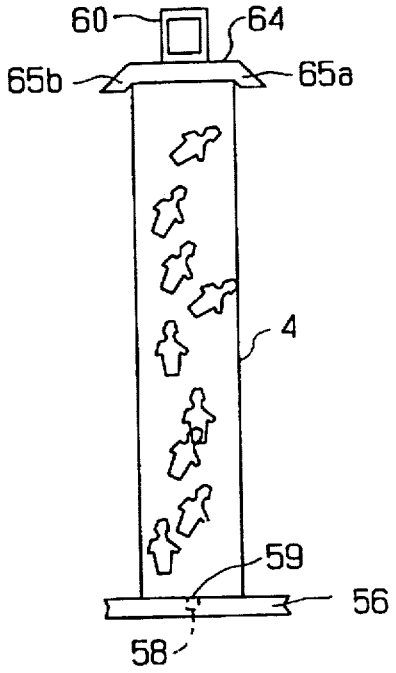
FIG. 3 is an enlarged view of the structure for securing the tubular display elements to the rack system.

Referring to FIGS. 2 and 3, the rack system 10 of the present invention further has a top plate member 60 supported above the top support structure 12 by two vertical rod members 52a and 52b of essentially the same length. Since each side of the device is symmetrical, a description of rod member 52b is provided while a description of rod member 52a is not. The upper end 53b of rod member 52b is rigidly connected to the top plate member 60 at its ends 60a and 60b through aperture 61. The lower ends 54a and 54b of the rod members are connected to the rear ends of side bars 20a and 20b respectively.

A further supporting means in the form of base plate member 56 is provided above the top support member 12 to support a row of tubular elements 4 for displaying candy 24. Preferably, the base plate member 56 is rigidly connected to side bars 20a and 20b. Optionally, base plate member 56 can be further supported by support bar 57 which is connected to side bars 20a, 20b. The base plate member 56 has at least one flat upper surface for supporting tubular display elements 4. Therefore, tubular display elements 4 can be held between the top plate member 60 and base plate member 56. The top support structure 12 thus is used to hold both one row of candy containers 2 at its front section and one row of tubular display elements 4 near its rear edge. To retain the proper positioning of the tubular display elements 4, base plate 56 is provided with a plurality of alignment apertures 58, while the base of each tubular display element is provided with a locating pin 59. In addition to retaining elements 4 in their proper position, this construction prevents the unauthorized removal of the elements.

The candy container supply lids and outlets are provided with securement means to prevent unauthorized access. In prior art display elements, no such means are provided, so that the display element can be accessed to remove candy therefrom.

Figure 4:
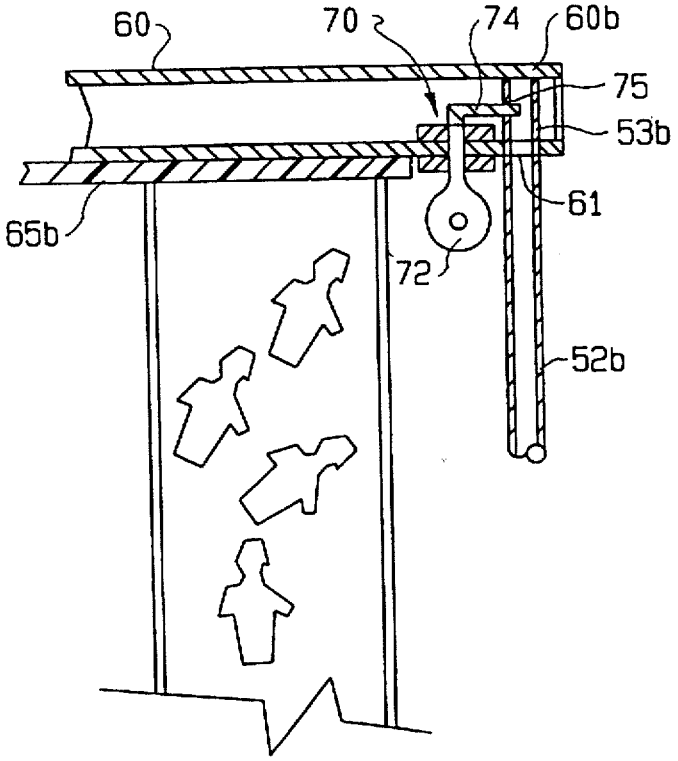
FIG. 4 is a cross-sectional view of a locking mechanism for securing the tubular display elements to the rack system.

FIGS. 3 and 4 illustrate the secure retention of tubular display elements 4 between plate members 56 and 60. After the pin 59 of tubular element 4 is placed into the base plate aperture 58, top plate member 60 is then placed upon columns 52a, 52b. Top plate member 60 is formed of a steel channel to which is welded or otherwise attached a U-shaped plate member 64 which has downwardly extending sidewalls 65a and 65b which receive and surround the top portion of the tubular elements. To prevent unauthorized removal of the tubular element or the candy contained therein, the top plate member 60 is provided with a locking mechanism on each end. FIG. 4 illustrates a preferred locking member 70 which includes key 72, and cam member 74. When the top plate member 60 is installed onto the ends of columns 52a and 52b, key 72 is then inserted to rotate the cam member 74 from a position where it does not engage column end 53b, to the position shown in FIG. 4 where the cam member 74 is positioned within a slot 75 which is in the end 53b of column member 52b. As noted above, the top plate member 60 is symmetrical so the identical locking arrangement would be provided on the opposite side 60a for locking that side of the plate member into the top portion of column 52a.

It should be noted however that an alternative design which requires only one locking mechanism can instead can be used. In this embodiment, end 60a of top plate member 60 would be connected to the top portion of 52a of column 52b by a pivoting mechanism. Thus, the top plate member 60 can be installed upon the tubular display elements 4 by pivoting end 60b downwardly so that the top plate member 60 engages the tubular elements 4 and the aperture 61 of end 60i b engages top end of 53b of column 52b as shown in FIG. 3.

Preferably, each of the vertical supporting rods aligns with the rear portions of the side bars at the same side of the rack system 10, e.g., rod 52b aligns with vertical supporting rods 47b, 49b and 51b. Alternatively, rod members 51b, 49b, 47b and 52b can be unitary single continuous supporting rod, passing through apertures in the side bars. The single rod can be joined at the points where the rod passes through the side bars, by welding or brazing. Such an arrangement adds rigidity to the entire rack system 10.

The rack system 10 can have a plurality of wheels 80 or casters connected to its bottom structure through conventional means. Preferably, two wheels 80 are attached to each of the side bars 23a and 23b below the bottom support structure 18. These wheels 80 are preferably universal wheels which make the entire rack system 10 easily moveable so that the rack system 10 can be placed at different locations as needed.

The tubing structure of the rack system 10 of the present invention provides sufficient open area 35, 37 and 39 so that the candy inside containers 2 or tubular display elements 4 is visible from the front, back or sides of the rack system 10. The rack system 10 also provides sufficient strength to retain containers 2 and tubular display elements 4 in position without bending of the rack 10 and also to support the entire weight of the rack system 10. In this regard, FIG. 2 illustrates the use of reinforcing bars 76, 78, which are joined to each other at 79 and which are joined to vertical rod members 47a, 51b and 47b, 51a, respectively. Again, these joints are made by welding or brazing and the reinforcing bars add strength and rigidity to the rack system.

Figure 5:
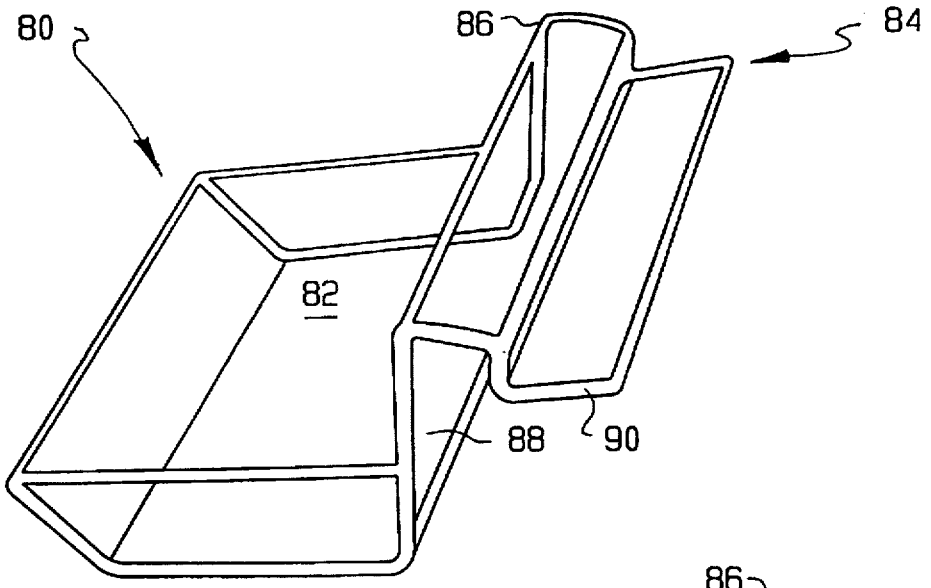
FIGS. 5–7 are a perspective views of a preferred catch basins according to the present invention.
Figure 6:
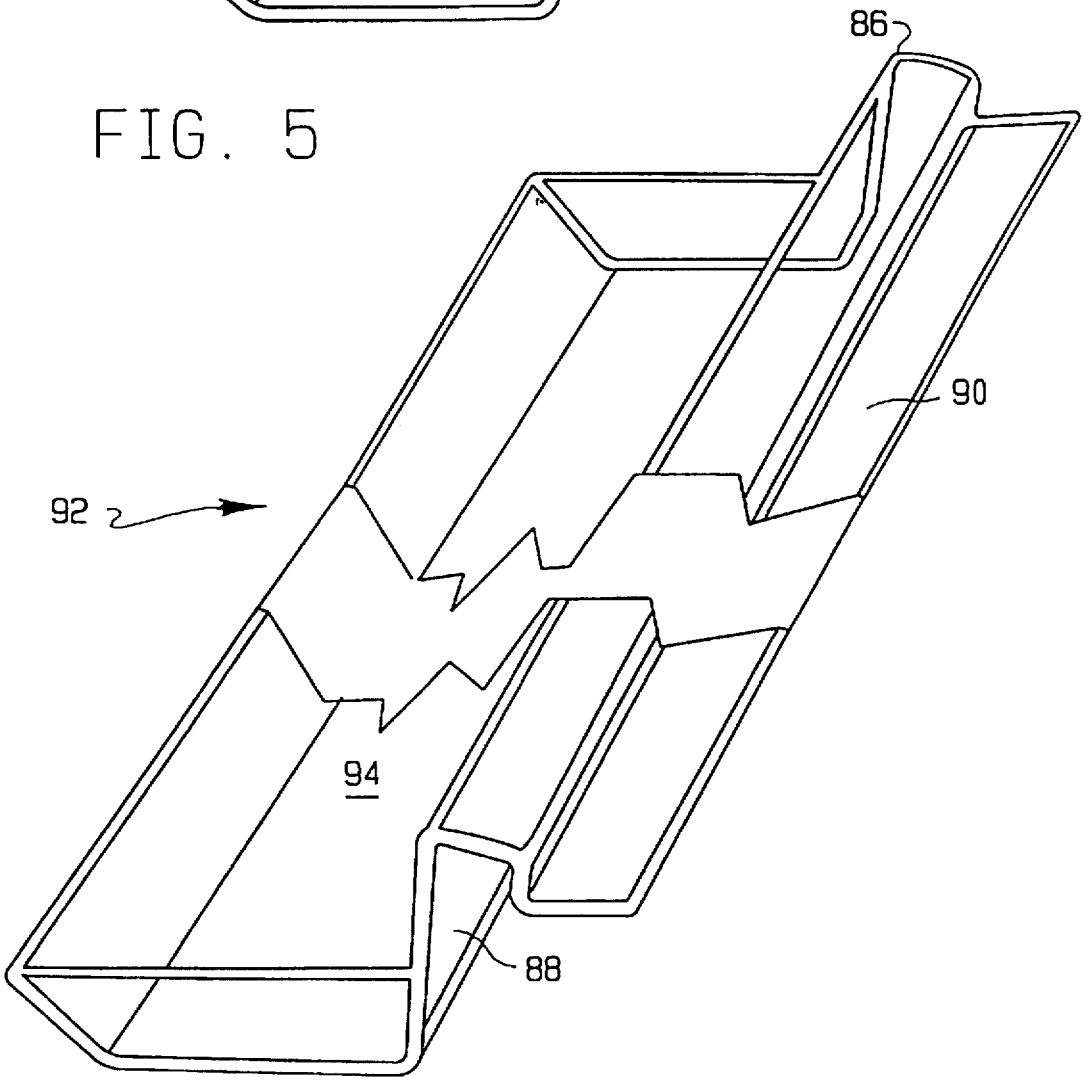
Figure 7:
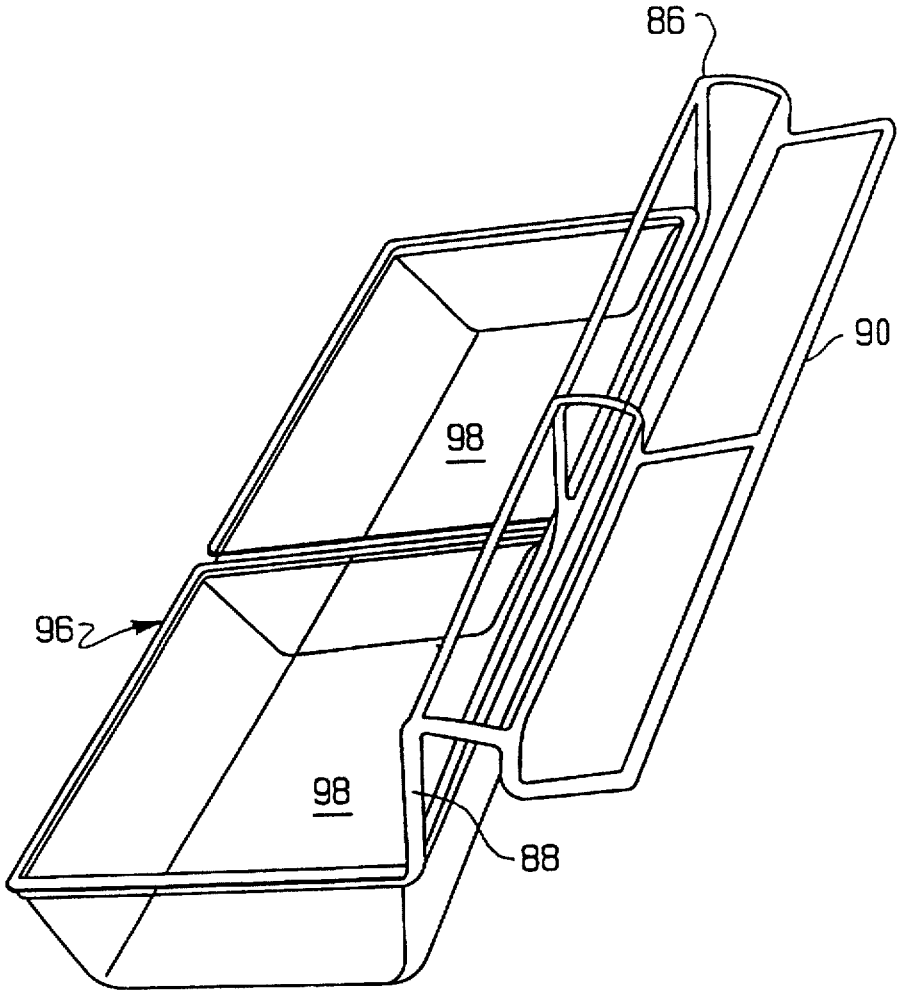

Referring to FIGS. 5 to 7, a candy catch basin according to the present invention is shown. The candy catch basin 80 of FIG. 5 has an open-ended bowl 82 for receiving either dispensed or spilled candy from the candy container 2. The bowl 82 can be held in position by the supporting means 84. The candy catch basin can be dimensioned for use with each individual candy dispenser 2, wherein the bowl is positioned beneath the outlet of each container.

The supporting means 84 comprises a hook member 86, a suspension means 88 and an extension 90 which are integrally formed with the bowl 82. The hook member 86 is shaped to engage the support bars of the rack for connecting the catch basin to the support bars. Preferably, the hook member 86 has a horizontally extended slot, which can be supported on top of a supporting rod in the rack. The suspension means 88 is integral with an elevated side of the bowl 82 so that the bowl can be hung from the hook member 86 and held beneath the container 2 outlet. Extension 90 engages the bottom of the container 2 to position the catch basin in the appropriate orientation beneath the outlet to receive candy from the bowl.

In the embodiment shown in FIG. 5, the bowl and the supporting means are integral. If desired, however, the bowl can be made as a replaceable component which is supported by a structure-which is attached to the rack. Also, since the support bar is cylindrical, the extension 90 is needed to properly position the bowl 80 in a substantially horizontal position. If square or rectangular tubing is used as the support bar, the extension 90 would be made optional by configuring the hook member 86 to conform to the square or rectangular tubing, thus securely retaining the catch basin on the rack with the bowl in the horizontal position.

When the desired number of candy containers 2 are loaded in the candy rack in adjacent relation, a row of catch basins can be arranged corresponding to the candy container 2 outlets. Alternatively, a single, elongated catch basin 92, as shown in FIG. 6 can be dimensioned to span the width of an entire row beneath the outlets of each container 2. In one embodiment of present invention, such a single catch basin 92 has an elongated container 94 which can extend over the width of the entire row of the candy dispensers 2. However, the hook member 86, the suspension means 88, and the extension 90 can be either elongated to extend over the entire width of the rack or separated into, e.g., various segments to be spaced from each other for supporting the container.

The preferred construction for the catch basins of FIGS. 5 and 6 are as an integral clear plastic material, such as acrylic or plexiglass.

In another embodiment, shown in FIG. 7, the single elongated catch basin can have a wire structure 96 spanning the width of the entire row of candy containers 2 as a support. Structure 96 includes open areas to receive individual bowls 98, as well as a hook member 86, suspension means 88 and extension 90 as in FIG. 6, except that these components are made of wire. Then, individual bowls 98 supported by the structure 96 are placed beneath each outlet of the candy containers 2. In such an arrangement, each bowl 98 can be removed from the wire structure 96 for cleaning or replacement. Stainless steel or aluminum can be used to form the wire structure, while the bowls can be made of plastic.

Candy containers 2 are conventional, in that they include a supply of candy 24, an outlet 32 and a rack mechanism 15 for urging candy into the outlet 32. Thereafter, gate 31 is opened to release and dispense candy 24 from the outlet 32. After any of the candy catch basins of FIGS. 5, 6 or 7 are attached to the rack structure in position beneath the outlets of the containers, any candy 24 which is improperly dispensed or spilled from the containers will be received by the catch basis to prevent such candy from spilling on the floor. In addition to preventing waste of the candy, the area around the rack structure can be retained in a clean and sanitary condition.

The foregoing description is only illustrative of the principles of the present invention. It is to be recognized and understood that the invention is not to be limited to the exact configurations as illustrated and described herein. Accordingly, all expedient modifications readily attainable by one versed in the art from the disclosure set forth herein that are within the scope and spirit of the present invention are to be included as further embodiments thereof.

What is claimed is:

1. A rack structure for displaying and dispensing candy which comprises:

a plurality of enclosed containers arranged in a first row, each container being totally enclosed on all sides and having a base, a supply of candy and a downwardly extending outlet for dispensing candy from the supply; and a support structure for retaining the containers in spaced relation in the first row and including first and second horizontally disposed rods each having first and second ends, said enclosed containers being supported on said first and second horizontally disposed rods; means for engaging the rod ends to maintain the rods in substantially parallel spaced relation for supporting the base of each container; means for positioning the support structure to enhance the visibility of the containers; and at least one catch basin supported on the first horizontal rod in position under one or more of the container outlets for receiving candy that has been improperly dispensed, thus preventing spills of the same.

2. The rack structure of claim 1 wherein a separate catch basin is positioned beneath each container outlet.

3. The rack structure of claim 2 wherein the catch basin is made of plexiglass and has a base portion, at least one sidewall extending from the base portion and a hook member for engaging the first horizontal rod.

4. The rack structure of claim 1 wherein the catch basin has an elongated portion which spans the entire width of the row of containers and is positioned beneath the container outlets.

5. The rack structure of claim 1 which further comprises a plurality of containers arranged in a second row, each container having a base, a supply of candy and an outlet for dispensing candy from the supply; and a support structure for retaining the containers in spaced relation in the second row and including first and second horizontally disposed rods each having first and second ends; means for engaging the rod ends to maintain the rods in substantially parallel spaced relation for supporting the base of each container; means for positioning the support structure to enhance the visibility of the containers; and at least one catch basin supported on the first horizontal rod in position under one or more of the container outlets for receiving candy that has been improperly dispensed, thus preventing spills of the same;

wherein the support structure for the second row is positioned subjacent to the support structure of the first row and in offset vertical relation, therewith.

6. The rack structure of claim 5 wherein the first and second row rod ends engaging means each comprises first and second bar members, the first bar members each engaging the first rod ends of the first and second horizontal rods in the respective rows and the second bar members each engaging the second rod ends of the first and second horizontal rods in the respective rows.

7. The rack structure of claim 6 wherein the positioning means for the first row support structure comprises means for connecting the first and second bar members of the first row support structure to the first and second bar members of the second row support structure, the connecting means comprising vertically extending rod members having upper and lower ends.

8. The rack structure of claim 7 wherein each connecting means comprises two pair of vertically extending rod members, one pair positioned adjacent the first containers of the first and second rows with the other pair positioned adjacent the last containers of the first and second rows.

9. The rack structure of claim 7 which further comprises a bar member for connecting the lower ends of each pair of vertically extending rod members, and wheel means associated with each lower end connecting bar member to facilitate movement of the rack structure.

10. The rack structure of claim 9 wherein the lower end connecting bar members are maintained in spaced relation by at least two horizontally extending support bars for strengthening the structure and for providing a support structure for storage of materials thereon.

11. The rack structure of claim 8 which further comprises a plurality of containers arranged in a third row, each container having a base, a supply of candy and an outlet for dispensing candy from the supply; and a support structure for retaining the containers in spaced relation in the third row and including first and second horizontally disposed rods each having first and second ends; means for engaging the rod ends to maintain the rods in substantially parallel spaced relation for supporting the base of each container; means for positioning the support structure to enhance the visibility of the containers; and at least one catch basin supported on the first horizontal rod in position under one or more of the container outlets for receiving candy that has been improperly dispensed, thus preventing spills of the same;

wherein the support structure for the third row is positioned subjacent to the support structure of the second row and in offset vertical relation therewith.

12. The rack structure of claim 11 wherein the positioning means for the second row support structure comprises means for connecting the first and second bar members of the second row support structure to the first and second bar members of the third row support structure, the connecting means comprising vertically extending rod members having upper and lower ends.

13. The rack structure of claim 12 wherein at least one of the vertically extending rod members is a single rod member which extends directly from the first support structure through the second support structure to the third support structure.

14. A rack structure for displaying and dispensing candy which comprises:

a plurality of containers arranged in a first row, each container having a base, a supply of candy and an outlet for dispensing candy from the supply; and a support structure for retaining the containers in spaced relation in the first row and including first and second horizontally disposed rods, each of the first and second horizontally disposed rods having first and second ends; means for engaging the rod ends to maintain the rods in substantially parallel spaced relation for supporting the base of each container; means for positioning the support structure to enhance the visibility of the containers; and at least one catch basin supported on the first horizontal rod in position under one or more of the container outlets for receiving candy that has been improperly dispensed, thus preventing spills of the same, wherein the catch basin has an elongated portion which spans the entire width of the row of containers and is positioned beneath the container outlets, and includes a wire support structure.

15. The rack structure of claim 14 wherein the wire support structure of the catch basin extends along the width of the row of containers and includes a bowl member and an open area beneath each container outlet which is configured and dimensioned to support the bowl member so that each bowl member is positioned below a container outlet.

16. A rack structure for displaying and dispensing candy which comprises:

a plurality of containers arranged in a first row, each container having a base, a supply of candy and an outlet for dispensing candy from the supply;

a support structure for retaining the containers in spaced relation in the first row and including first and second horizontally disposed rods, each of the first and second horizontally disposed rods having first and second ends; means for engaging the rod ends to maintain the rods in substantially parallel spaced relation for supporting the base of each container; means for positioning the support structure to enhance the visibility of the containers; and at least one catch basin supported on the first horizontal rod in position under one or more of the container outlets for receiving candy that has been improperly dispensed, thus preventing spills of the same;

a plurality of containers arranged in a second row, each container having a base, a supply of candy and an outlet for dispensing candy from the supply;

a support structure for retaining the containers in spaced relation in the second row and including first and second horizontally disposed rods, each of the first and second horizontally disposed rods having first and second ends; means for engaging the rod ends to maintain the rods in substantially parallel spaced relation for supporting the base of each container; means for positioning the support structure to enhance the visibility of the containers; and at least one catch basin supported on the first horizontal rod in position under one or more of the container outlets for receiving candy that has been improperly dispensed, thus preventing spills of the same; and a series of tubular elements for displaying the candy of some of the containers and being retained on one of the support structure for the first row and the support structure of the second row.

wherein the support structure for the second row is positioned subjacent to the support structure of the first row and in offset vertical relation therewith.

17. The rack structure of claim 16 wherein the at least two vertically extending rod members are connected by a base plate member for supporting the tubular elements, and by a top plate member for retaining the tubular elements in the desired position on the base plate member, the base plate member being retained on one of the support structure for the first row and the support structure of the second row.

18. The rack structure of claim 17 wherein each tubular element has a top end, a bottom end and positioning means associated with the bottom end while the base plate member includes alignment means for engaging the positioning means of each tubular element.

19. The rack structure of claim 18 wherein the top plate member has first and second ends, a central elongated portion and first and second wall members which extend past the top ends of the tubular elements, wherein each of the first and second ends of the top plate member includes locking means for engaging the vertical rod member to prevent unauthorized removal of the tubular elements or contents therein.

20. The rack structure of claim 19 wherein each locking means comprises a slot in the respective vertical rod member and a cam member positioned in the top plate member, the cam being movable between a first position wherein the cam engages the slot of the vertical rod member for securely retaining the top plate member to the vertical rod member and a second position where the cam is positioned away from the slot so that the top plate member can be removed from the vertical rod members to allow access to the tubular elements or contents therein.

21. The rack structure of claim 20 wherein the two vertical rod members extend above the first row and are connected by a base plate member for supporting a series of tubular elements for displaying the candy of some of the containers, and by a top plate member for retaining the tubular elements in the desired position on the base plate member.

22. The rack structure of claim 21 wherein each vertical rod member has a lower end, and the two vertical rod members extend below the third row and include a bar member for connecting the lower ends of each vertical rod member to the other vertically extending rod member of the positioning means for the third support structure.

23. The rack structure of claim 22 which further comprises reinforcement members for strengthening the rack structure.

24. The rack structure of claim 23 wherein the reinforcement members comprise diagonally extending bars which connect the vertical rod members.

25. The rack structure of claim 24 wherein the lower end connecting bar members are maintained in spaced relation by at least two horizontally extending support bars for strengthening the structure and for providing a support structure for storage of materials thereon, and further including wheel means associated with each lower end connecting bar member to facilitate movement of the rack structure.

*26. A rack structure for displaying and dispensing candy which comprises:*

*a plurality of enclosed containers arranged in a first row, each container being totally enclosed on all sides and having a base, a supply of candy and a downwardly extending outlet for dispensing candy from the supply; and*

*a support structure for retaining the containers in spaced relation in the first row and including first and second horizontally disposed rods each having first and second ends, said enclosed containers being supported on said first and second horizontally disposed rods; means for engaging the rods to maintain the rods in substantially parallel spaced relation for supporting the base of each container; means for positioning the support structure to enhance the visibility of the containers; and at least one catch basin supported on the first horizontal rod in position under one or more of the container outlets for receiving candy that has been improperly dispensed, thus preventing spills of the same.*

*27. The rack structure of claim 26 wherein a separate catch basin is positioned beneath each container outlet.*

*28. The rack structure of claim 27 wherein the catch basin is made of plexiglass and has a base portion, at least one sidewall extending from the base portion and a hook member for engaging the first horizontal rod.*

*29. The rack structure of claim 26 wherein the catch basin has an elongated portion which spans the entire width of the row of containers and is positioned beneath the container outlets.*

*30. The rack structure of claim 26 which further comprises a plurality of enclosed containers arranged in a second row, each container having a base, a supply of candy and an outlet for dispensing candy from the supply; and*

*a support structure for retaining the containers in spaced relation in the second row and including first and second horizontally disposed rods each having first and second ends; means for engaging the rods to maintain the rods in substantially parallel spaced relation for supporting the base of each container; means for positioning the support structure to enhance the visibility of the containers; and at least one catch basin supported on the first horizontal rod in position under one or more of the container outlets for receiving candy that has been improperly dispensed, thus preventing spills of the same;*

*wherein the support structure for the second row is positioned subjacent to the support structure of the first row and in offset vertical relation therewith.*

*31. The rack structure of claim 30 wherein the first and second row rod engaging means each comprises first and second bar members, the bar members each engaging the first and second horizontal rods in the respective rows.*

*32. The rack structure of claim 31 wherein the positioning means for the first row support structure comprises means for connecting the first and second bar members of the first row support structure to the first and second bar members of the second row support structure, the connecting means comprising vertically extending rod members having upper and lower ends.*

*33. The rack structure of claim 32 wherein each connecting means comprises two pair of vertically extending rod members, one pair positioned adjacent the first containers of the first and second rows with the other pair positioned adjacent the last containers of the first and second rows.*

*34. The rack structure of claim 33 wherein the lower end connecting bar members are maintained in spaced relation by at least two horizontally extending support bars for strengthening the structure and for providing a support structure for storage of materials thereon.*

* * * * *